United States Patent [19]

Wilburth

[11] Patent Number: 4,546,708
[45] Date of Patent: Oct. 15, 1985

[54] DESK TOP ORGANIZER

[76] Inventor: Daniel N. Wilburth, 3757 W. Grange, Greenfield, Wis. 53221

[21] Appl. No.: 519,262

[22] Filed: Aug. 1, 1983

[51] Int. Cl.[4] ............................................. A47B 21/03
[52] U.S. Cl. .................................... 108/94; 108/103; 108/142; 248/282
[58] Field of Search .................. 108/92, 94, 102, 103, 108/142; 248/282, 283, 425

[56] References Cited

U.S. PATENT DOCUMENTS

| | | | |
|---|---|---|---|
| 790,217 | 5/1905 | Mason | 248/282 X |
| 1,894,146 | 1/1933 | Baker | 108/94 X |
| 4,305,563 | 12/1981 | Presson | 108/140 X |

FOREIGN PATENT DOCUMENTS 3019797  11/1981  Fed. Rep. of Germany ........ 108/94
1207485  2/1960   France .............................. 108/102

Primary Examiner—William E. Lyddane
Assistant Examiner—Peter R. Brown
Attorney, Agent, or Firm—Andrus, Sceales, Starke & Sawall

[57] ABSTRACT

A support for supporting a cathode ray tube display screen and keyboard of a computer terminal at a work station. The support includes a base, a turntable rotatably mounted on the base for supporting the display screen, and a rotatable platform connected to the turntable by a pair of articulated arms for supporting the keyboard. Both the turntable and platform may be rotated to any desired position and the platform may additionally be moved toward and away from as well as laterally with respect to the turntable to allow the display screen and keyboard to be moved to a multiplicity of positions at the work station.

1 Claim, 3 Drawing Figures

DESK TOP ORGANIZER

BACKGROUND OF THE INVENTION

The present invention relates to supports, and more particularly to a desk top organizer for supporting a cathode ray tube display screen and keyboard of a computer terminal at a work station.

Computer terminals having a cathode ray tube display screen and a keyboard are widely used in various industries. In the conventional assembly, the display screen is positioned immediately above and to the rear of the keyboard. A common practice is to locate the display screen and keyboard on a horizontal surface at a work station such as a desk. Such an arrangement, however, limits the usuable work area in front of the operator. Thus, it is desirable to provide additional open work area on the desk of an operator of a computer terminal.

Several types of supports are known for movably supporting the components of a computer terminal at a work station. For example, U.S. Pat. No. 4,305,563 shows a computer terminal support having a rotatable base for supporting the display screen and a carriage for supporting the keyboard slidably attached to the base. The carriage may be moved between a closed position adjacent the base and an open position away from the base. However, the keyboard and display screen must always be assembled in direct alignment with one another. Thus, work space at the center of a desk top remains limited. Additionally, such an assembly may not be compatible with space limitations commonly encountered at work stations. Another type of computer terminal assembly is shown in U.S. Pat. No. 4,313,112. This assembly also provides a structure for supporting the keyboard, copy material and display screen in line with one another centrally on top of a desk. Such an assembly also suffers from both of the heretofore mentioned disadvantages.

Thus, it is desirable to provide a support for the components of a computer terminal which enables the display screen and keyboard to be moved to a multiplicity of positions to maximize operator productivity, free up work space at a work station, and be compatible with the various space limitations at work stations.

SUMMARY OF THE INVENTION

A support for supporting components such as a cathode ray tube display screen and keyboard of a computer terminal and the like at a work station. The support enables both the display screen and keyboard to have the capability of being rotated to any desired position. Additionally, the support enables the keyboard to be movable toward and away from as well as laterally with respect to the display screen. The display screen and keyboard may thus be moved to a multiplicity of positions to maximize operator productivity, be compatible with the various space limitations at work stations as well as to free up work space at the work station.

The support includes a base mounted on a horizontal surface at the work station, a turntable rotatably mounted on the base for supporting the display screen, and a rotatable platform connected to the turntable by a pair of articulated arms for supporting the keyboard. The articulated arms provide relative movement of the platform toward and away from as well as laterally with respect to the turntable.

A stop member depends from the underside of the turntable for supporting the turntable in fixed relationship to the base when the turntable has been rotated to a desired work position. The stop member may be conveniently located at the connection of the articulated arms to the turntable.

BRIEF DESCRIPTION OF THE DRAWINGS

The drawings illustrate the best mode presently contemplated of carrying out the invention.

In the drawings.

DESCRIPTION OF THE PREFERRED EMBODIMENT

Figure 1:
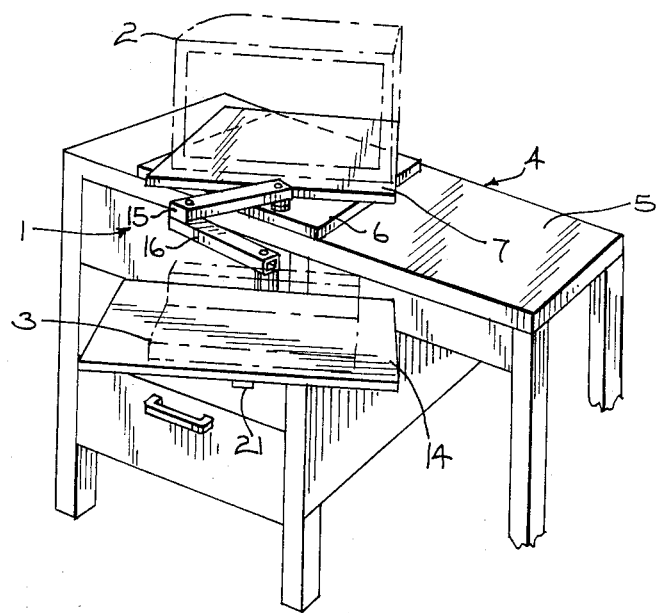
FIG. 1 is a front perspective view of a support for supporting a display screen and keyboard of a computer terminal constructed in accordance with the principles of the present invention.

Referring now to the drawings, FIG. 1 illustrates a support generally designated by the numeral 1 for supporting a cathode ray tube display screen 2 and keyboard 3 of a computer terminal at a work station 4. Work station 4 is illustrated as being a desk of typical construction defining a horizontal work surface 5. Although illustrated as a desk, work station 4 may also be any type of table or portable cart upon which a computer terminal might be supported. Also, although illustrated as supporting screen 2 and keyboard 3, support 1 may be employed to support various other components typically used in tandem with one another in an office environment.

Figure 2:
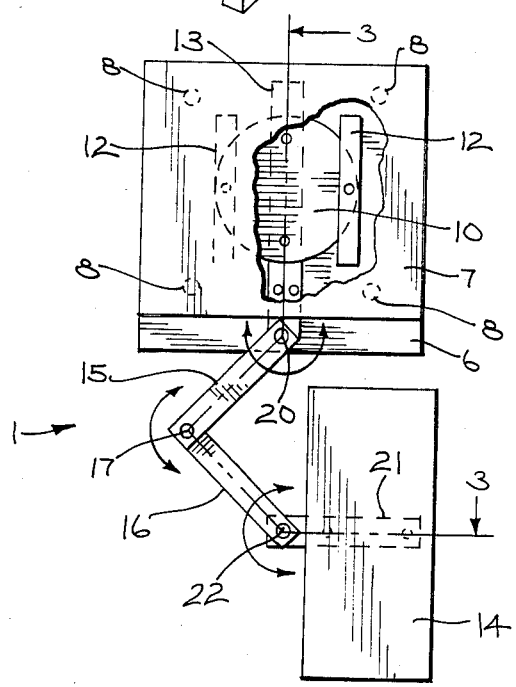
FIG. 2 is a plan view of the support shown in FIG. 1.

Support 1 includes a base assembly for supporting display screen 2 of the computer terminal. The base assembly includes a flat base plate 6 mounted on work surface 5, and a turntable 7 rotatably mounted on base 6. Both base 6 and turntable 7 are disposed substantially parallel to work surface 5 and both are substantially rectangular in shape. The width and thickness of base 6 and turntable 7 are identical, but as shown in FIG. 2 the length of base 6 is slightly greater than the length of turntable 7. For example, base 6 may have a length of 20 inches, a width of 20 inches and a thickness of ⅝ inches while turntable 7 may be 18 inches in length, 20 inches wide and ⅝ inches thick. Rubber feet 8 are positioned on the undersurface of base 6 to protect work surface 5 from being scratched or otherwise marked and to stabilize base 6 in fixed relationship on surface 5.

The rotatable connection between turntable 7 and base 6 is provided by a bearing which includes an annular plate 9 affixed to the top of base 6 and a second annular plate 10 affixed to the bottom of turntable 7. Ball bearings are interposed between plates 9 and 10 to provide relative rotation therefore. This bearing thus permits 360° rotation of turntable 7 on base 6. In order to lend added support for mounting bearing plates 9 and 10, a pair of narrow side bracket plates 12 are positioned on the underside of turntable 7. Brackets 12 are spaced apart a distance substantially equal to the diameter of bearing plate 10. Additionally, a center bracket plate 13 is positioned between side brackets 12. As shown, bracket 13 is longer than brackets 12 and is positioned so that one of its edge margins projects forwardly from the front edge of turntable 7, the purpose of which will hereinafter be described. Thus, in order to attach turntable 7 to base 6, bearing plate 10 is first screwed to brackets 12 and 13, and then a plurality of screws are passed through base 6 into bearing plate 9.

Support 1 also includes a flat platform 14 for supporting keyboard 3 of the computer terminal. Platform 14 is rectangular in shape and has a length of about 9¾ inches, a width of about 20 inches and a thickness of about ⅜ inches.

A pair of articulated arms 15 and 16 interconnect platform 14 with turntable 7 and provide relative movement for platform 14 toward and away from as well as laterally with respect to turntable 7. Arm 15 is pivotally mounted at its inner end to turntable 7 and is pivotally connected at its outer end to the inner end of arm 16. Platform 14 in turn is pivotally mounted to the outer end of arm 16. As shown best in FIG. 3, arm 16 is positioned beneath arm 15, and the pivotal connection between arms 15 and 16 is provided by a pin or bolt 17 which extends through both arms 15 and 16 and an annular spacer 11, and is held in position by a lock nut 25. The pivotal connection of arm 15 to turntable 7 includes an annular spacer 18 positioned beneath arm 15 and above bracket 13, an annular stop member 19 positioned beneath bracket 13, and a pin or bolt 20. As shown, bolt 20 passes through aligned openings in the inner end of arm 15, spacer 18, bracket 13 and stop member 19 to provide the pivotal connection. The end of bolt 20 is threadedly engaged in bracket 13 and stop member 19 to prevent its removal. Spacers 18 and 11 and stop member 19 are preferably composed of a self-lubricating plastic material such as that commercially available under the trade designation DELRIN. Thus, arm 15 may be pivoted approximately 180° with respect to turntable 7 while at the same time arm 16 may be pivoted approximately 360° with respect to arm 15.

Figure 3:
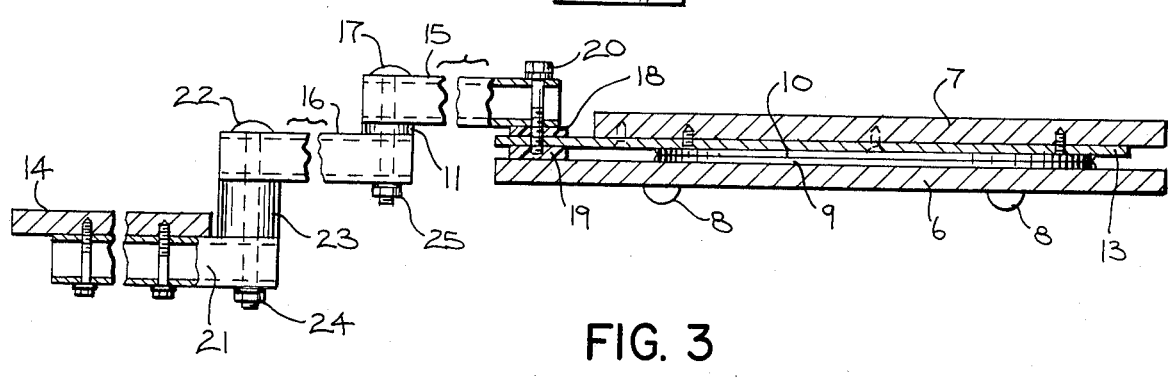
FIG. 3 is a sectional view taken along the plane of the line 3—3 in FIG. 2.

As shown best in FIG. 3, support 1 includes a bearing means for rotatably supporting platform 14 on the outer end of arm 16. This bearing means includes a support arm 21 pivotally connected at its inner end to the outer end of arm 16. Arm 21 is disposed centrally beneath platform 14 and is mounted thereto by screws thus providing a support for platform 14. The pivotal connection of support arm 21 to arm 16 is provided by a pin or bolt 22, an annular spacer 23 between arms 16 and 21, and a lock nut 24. As shown, bolt 22 extends through aligned openings in the outer end of arm 16, spacer 23 and the inner end of support arm 21 so that platform 14 lies in a plane spaced beneath turntable 7. As shown, arms 15, 16 and 21 are each constructed of one and one quarter inch square metal tubing having a length of about 10 and ¾ inches.

In operation, an operator places display screen 2 on top of turntable 7 and keyboard 3 on top of platform 14 The operator may then adjust the position of screen 2 by lifting platform 14 so that stop member 19 is disengaged from the top surface of base 6. The operator may then rotate turntable 7 to the desired position. In order to adjust the position of keyboard 3, an operator merely rotates platform 14 and moves arms 15 and 16 to the desired position. It should be noted that once pressure is released from platform 14 stop member 19 once again engages the top surface of base 6 to not only provide support for turntable 7, but also to act as a brake by frictionally engaging base 6 to support turntable 7 in fixed relationship to base 6.

A support for supporting components such as a cathode ray tube display screen and keyboard of a computer terminal and the like at a work station has been illustrated and described. The support permits the screen and keyboard to be moved to a multiplicty of positions to maximize operator productivity, free up work area on a desk, and be compatible with the limited space requirements of such work stations. Various modifications and/or substitutions may be made to the specific components described without departing from the spirit and scope of the present invention. For example, various types of pivotal connections and bearing members may be utilized.

Various modes of carrying out the invention are contemplated as being within the scope of the following claims particularly pointing out and distinctly claiming the subject matter which is regarded as the invention.

I claim:

1. A support for supporting components such as a cathode ray tube display screen and keyboard of a computer terminal and the like at a work station, comprising:

a base mounted on a horizontal surface at the work station;

a turntable rotatably mounted on said base for supporting one of said components thereon;

first bearing means for rotatably mounting said turntable on said base, said first bearing means includes an upper annular plate adjacent said turntable and a lower annular plate adjacent said base;

support means for reinforcing the mounting of said turntable on said first bearing means, said support means includes a central bracket plate positioned between said upper bearing plate and said turntable that extends radially with respect to said upper bearing plate so that one end projects from an edge of said turntable and a pair of side bracket plates located parallel to and on opposite sides of said central bracket plate between said upper bearing plate and said turntable;

a platform for supporting another of said components thereon;

connecting means for interconnecting said platform and turntable for providing relative movement of said platform toward and away from as well as laterally with respect to said turntable, said connecting means includes a first arm pivotally mounted at one end to said projecting one end of said central bracket plate, and a second arm pivotally mounted at one end to the other end of said first arm, second bearing means for rotatably mounting said platform on the other end of said second arm, said second bearing means includes a third arm supporting said platform and pivotally mounted at one end to the other end of said second arm;

stop means for supporting said turntable in fixed relationship to said base when said turntable is rotated to any one of a plurality of desired work positions, said stop means is located at the pivotal connection of said first arm to said turntable and includes an annular stop member positioned beneath said projecting one end of said central bracket plate having a planar surface frictionally slidably engageable with a corresponding planar surface on said base, and the pivotal connection of said first arm to said central bracket plate includes a pin extending through said first arm and central bracket plate into said annular stop member.

* * * * *